(12) United States Patent
Yoon et al.

(10) Patent No.: US 9,184,879 B1
(45) Date of Patent: Nov. 10, 2015

(54) OPTIMAL MAXIMUM LIKELIHOOD SIGNAL DETECTION METHOD AND APPARATUS FOR MIMO SYSTEM

(71) Applicant: INDUSTRY-UNIVERSITY COOPERATION FOUNDATION HANYANG UNIVERSITY, Seoul (KR)

(72) Inventors: Dongweon Yoon, Seoul (KR); Hyeongyong Lim, Seoul (KR); Yeonsoo Jang, Seoul (KR); Taijun Li, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 0 days.

(21) Appl. No.: 14/512,357

(22) Filed: Oct. 10, 2014

(30) Foreign Application Priority Data

Jul. 17, 2014 (KR) ........................ 10-2014-0090638

(51) Int. Cl.
*H04B 7/02* (2006.01)
*H04L 1/00* (2006.01)
*H04B 7/04* (2006.01)

(52) U.S. Cl.
CPC ............ *H04L 1/0054* (2013.01); *H04B 7/0413* (2013.01)

(58) Field of Classification Search
CPC .................. H04L 2025/03426; H04L 25/067; H04L 1/0054; H04L 1/0048; H04B 7/0413; H04B 7/0891; H04B 1/71057; H04B 7/0456
USPC ......................................................... 375/267
See application file for complete search history.

(56) References Cited

U.S. PATENT DOCUMENTS

| | | | |
|---|---|---|---|
| 2008/0279299 A1* | 11/2008 | Reuven et al. | 375/267 |
| 2010/0124301 A1* | 5/2010 | Bahng et al. | 375/341 |
| 2014/0185716 A1* | 7/2014 | Aubert | 375/341 |
| 2014/0334561 A1* | 11/2014 | Liang et al. | 375/260 |

* cited by examiner

*Primary Examiner* — Don N Vo

(57) ABSTRACT

An optimal maximum likelihood signal detection method and apparatus for a MIMO system are disclosed. An embodiment of the invention can provide an optimal signal detection method for a multiple-input multiple-output system that includes: determining the smallest metric of the final layer expanded from the candidate symbols of the i-th detection layer as the optimal threshold of the i-th detection layer; and selecting surviving candidate symbols from among the candidate symbols of the i-th detection layer by using the optimal threshold.

13 Claims, 14 Drawing Sheets

OPTIMAL MAXIMUM LIKELIHOOD SIGNAL DETECTION METHOD AND APPARATUS FOR MIMO SYSTEM

CROSS-REFERENCE TO RELATED APPLICATIONS

This application claims the benefit of Korean Patent Application No. 10-2014-0090638, filed with the Korean Intellectual Property Office on Jul. 17, 2014, the disclosure of which is incorporated herein by reference in its entirety.

BACKGROUND

1. Technical Field

The present invention relates to an optimal maximum likelihood signal detection method and apparatus for a MIMO system that can provide optimal signal detection of the same quality as maximum likelihood detection by setting an optimal threshold for selecting the number of surviving candidate symbols variably for the adaptive detection of signals in each detection layer according to the channel environment or the signal-to-noise ratio (SNR) based on the QR decomposition (QRD)-M algorithm in a MIMO system.

2. Description of the Related Art

A multiple-input multiple-output (MIMO) system can increase system efficiency without additional bandwidth or increased transmission power. For this reason, the MIMO system is widely being employed or considered in current communication standards.

Maximum likelihood (ML) detection is known as an optimal algorithm for signal detection in a MIMO system. Although ML detection provides an optimal error performance, there is the drawback that its computational complexity grows exponentially according to increases in the number of multiple inputs at the transmitter and in modulation order. Due to such increase in computational complexity, it may actually be impossible to implement in communication and/or broadcasting systems having a large number of multiple inputs (the number of antennas or the number of channels) or a high modulation order. For example, the Long Term Evolution (LTE)-advanced standard employs the Single Carrier Frequency Division Multiple Access (SC-FDMA) technology for the uplink, and if 4-Quadrature Amplitude Modulation (QAM) and 16-QAM modulation were applied and two resource blocks (RB: 1 RB being 12 subchannels) were allotted to a user, then a ML detection for a receiver would require computing the Euclidean norm $4^{24}=2^{48}$ times (approximately 281 trillion times) and $16^{24}=2^{96}$ times (approximately $7.9\times 10^{28}$ times), respectively, which cannot be achieved with a typical personal computer.

In recent times, near ML detection methods have been proposed, such as the QRD-M detection method, which when applied in a signal detection algorithm provides a bit error rate (BER) performance comparable to that of the ML detection method. This can reduce complexity compared to ML detection while providing a performance comparable to the BER of ML detection, but cannot provide the same BER performance as does ML detection, and hence is referred to as "near ML" detection.

For instance, the QRD-M detection algorithm performs signal detection by selecting M candidate symbols in each detection layer and can reduce complexity compared to ML detection. However, the conventional QRD-M detection algorithm may constantly select candidate symbols for each detection layer. As a result, in the conventional QRD-M detection algorithm, the number of candidate symbols M should be set to a large value in order to obtain a comparable BER performance to the ML detection, and since a fixed M number of candidate symbols are selected for each detection layer even when the received SNR is high, the efficiency of the computational complexity may be degraded.

An adaptive threshold method was proposed as an improvement in which M candidate symbols are selected variably in each detection layer, but because an optimal threshold cannot be applied for each detection layer, it cannot achieve the same BER performance as that of ML detection and remains at a performance level comparable to the near ML detection methods.

SUMMARY

An aspect of the present invention is to provide an optimal maximum likelihood signal detection method and apparatus for a MIMO system that can provide optimal signal detection of the same BER quality as maximum likelihood detection by setting an optimal threshold for selecting the number of surviving candidate symbols variably for the adaptive detection of signals in each detection layer according to the channel environment or the SNR based on the QRD-M algorithm in a MIMO system.

Also, an aspect of the present invention is to provide an optimal maximum likelihood signal detection method and apparatus for a MIMO system that apply an optimal threshold to each detection layer, so that a symbol of maximum likelihood is always included during the detection of candidate symbols in each detection layer, and provide exactly the same BER performance as that of ML detection during signal detection in a MIMO system but with much lower computation complexity.

Also, an aspect of the present invention is to provide an optimal maximum likelihood signal detection method and apparatus for a MIMO system that can set the number of layers considered for setting a threshold for the i-th detection layer to D and limit the maximum number of surviving candidate symbols selected for each detection layer in order to prevent an unnecessarily large number of symbols being selected when the SNR is low.

According to an aspect of the invention, an optimal maximum likelihood signal detection method for a MIMO system is provided which can provide optimal signal detection of the same quality as maximum likelihood detection by setting an optimal threshold for selecting the number of surviving candidate symbols variably for the adaptive detection of signals in each detection layer according to the channel environment or the SNR based on the QRD-M algorithm in a MIMO system.

An embodiment of the invention can provide an optimal signal detection method for a MIMO system that includes: determining the smallest metric of the final layer expanded from the candidate symbols of the i-th detection layer as the optimal threshold of the i-th detection layer; and selecting surviving candidate symbols from among the candidate symbols of the i-th detection layer by using the optimal threshold.

The operation of determining the smallest metric of the final layer as the optimal threshold can include selecting the candidate symbol having the smallest metric from the i-th detection layer and expanding candidate branches to the (i+1)-th detection layer, where the expanding of the candidate branches can be performed iteratively up to the final layer.

The operation of selecting the surviving candidate symbols of the i-th detection layer can include selecting a candidate symbol having an accumulated squared Euclidean distance smaller than or equal to the optimal threshold from among the candidate symbols of the i-th detection layer as the surviving candidate symbol.

The operation of selecting the surviving candidate symbols can include selecting the surviving candidate symbols such that the number of surviving candidate symbols does not exceed a preset maximum candidate symbol limit number, if the number of candidate symbols of the i-th detection layer having the accumulated squared Euclidean distance smaller than or equal to the optimal threshold is greater than the maximum candidate symbol limit number.

The operation of selecting the surviving candidate symbols can include selecting the surviving candidate symbols such that the number of surviving candidate symbols does not exceed a preset maximum candidate symbol limit number in the order of smallest to largest metric of the candidate symbols of the i-th detection layer.

The optimal signal detection method for a MIMO system can further include an operation of selecting the candidate symbol having the smallest metric as the surviving candidate symbol in the final detection layer.

The smallest metric can be the smallest value of the accumulated squared Euclidean distance of each candidate symbol.

The number i can be a natural number and can be the index of the detection layer in which the surviving candidate symbols are selected, and the maximum value of i can be smaller than or equal to the index of the final detection layer.

According to another aspect of the invention, an optimal maximum likelihood signal detection apparatus for a MIMO system is provided which can provide the same quality of the ML detection by setting an optimal threshold for selecting the number of surviving candidate symbols variably for the adaptive detection of signals in each detection layer according to the channel environment or the SNR based on the QRD-M algorithm in a MIMO system.

An embodiment of the invention can provide an optimal signal detection apparatus for a MIMO system that includes: a threshold determining part configured to determine the smallest metric of the final layer expanded from the candidate symbols of the i-th detection layer as the optimal threshold of the i-th detection layer; and a candidate symbol selection part configured to select surviving candidate symbols from among the candidate symbols of the i-th detection layer by using the optimal threshold.

The threshold determining part can select the branch having the smallest metric from the i-th detection layer and can expand candidate branches to the (i+1)-th detection layer, with the expanding of the candidate branches performed iteratively up to the final layer, and can select the optimal threshold as the smallest metric of the final layer.

The threshold determining part can select the branch having the smallest metric from the i-th detection layer and can expand candidate branches to the (i+1)-th detection layer, with the expanding of the candidate branches performed iteratively up to the min(i+D, N)-th layer, where said N is the number of multiple inputs, said min(a, b) is a function representing the minimum value between a and b, and said i is an index of the detection layer in which the surviving candidate symbols are selected.

The candidate symbol selection part can select a candidate symbol having an accumulated squared Euclidean distance smaller than or equal to the optimal threshold from among the candidate symbols of the i-th detection layer as the surviving candidate symbol.

By providing an optimal ML signal detection method and apparatus for a MIMO system according to an embodiment of the invention, it is possible to provide optimal signal detection of the same quality as ML detection by setting an optimal threshold for selecting the number of surviving candidate symbols variably for the adaptive detection of signals in each detection layer according to the channel environment or the SNR based on the QRD-M algorithm in a MIMO system.

Also, since an optimal threshold is applied to each detection layer, a symbol of ML is always included during the detection of candidate symbols in each detection layer, and exactly the same BER performance as that of ML detection can be provided during signal detection in a MIMO system while the computation complexity is made much lower.

Also, it is possible to prevent an unnecessarily large number of symbols being selected when the SNR is low, by setting the number of layers considered for setting a threshold for the i-th detection layer to D and limiting the maximum number of surviving candidate symbols selected for each detection layer.

The advantages of the present invention can be illustrated by the following example. Suppose that 4-QAM and 16-QAM modulation were applied and two resource blocks (RB: 1 RB being 12 subchannels) were allotted to a user in an LTE-Advanced uplink. In this case, using maximum likelihood detection for a receiving channel would require computing the Euclidean norm $4^{24}=2^{48}$ times (approximately 281 trillion times) and $16^{24}=2^{96}$ times (approximately $7.9 \times 10^{28}$ times), respectively, which cannot be achieved with a typical personal computer. However, if an embodiment of the invention were to be used, the detection would be possible within a few minutes, even with a typical personal computer.

Additional aspects and advantages of the present invention will be set forth in part in the description which follows, and in part will be obvious from the description, or may be learned by practice of the invention.

DETAILED DESCRIPTION

Figure 1:
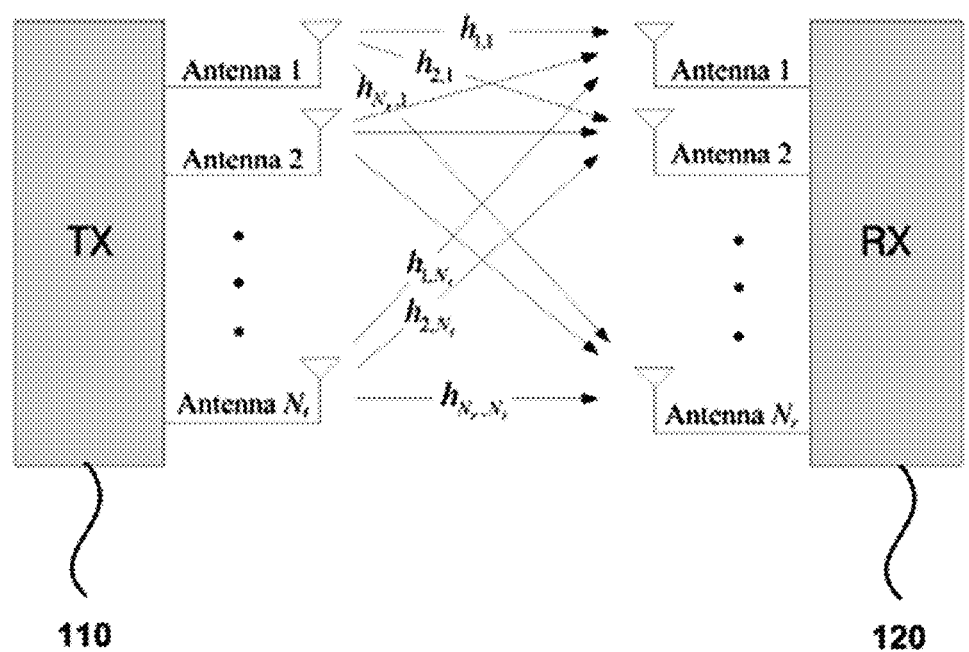
FIG. 1 is a diagram schematically illustrating the composition of a multi-antenna based MIMO system according to an embodiment of the invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

While such terms as "first" and "second," etc., may be used to describe various components, such components must not be limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Certain embodiments of the present invention are described below in more detail with reference to the accompanying drawings.

FIG. 1 is a diagram schematically illustrating the composition of a multi-antenna based MIMO system according to an embodiment of the invention.

A MIMO system based on an embodiment of the invention may include a transmitting device 110 and a receiving device 120. For easier understanding, the example in FIG. 1 has the transmitting device 110 and the receiving device 120 implemented as separate devices, but it is obvious that a transmitting device 110 can be a device which not only transmits data but also receives data from another transmitting device 110.

In an embodiment of the invention, it is assumed that the transmitting device 110 includes an $N_t$ number of antennas and the receiving device 120 includes an $N_r$ number of antennas.

When there are $N_t$ transmitting antennas and $N_r$ receiving antennas, the channel matrix H can be expressed as an $N_r \times N_t$ matrix. The element $h_{i,j}$ in the i-th row and j-th column of the channel matrix H represents the flat fading channel gain from the transmitting antenna j to the receiving antenna i.

$h_{i,j}$ can be a complex circularly symmetric complex Gaussian random variable satisfying $E[HH^H]=I_{N_r}$ that has a zero mean and unit variance. Here, $[\cdot]^H$ represents a Hermitian conjugate, and $I_N$ represents an N×N identity matrix.

Therefore, an $N_r \times 1$ received signal vector $y=[y_1, \ldots, y_{N_r}]^T$ can be expressed as Equation 1 below.

$$y = Hx + w \quad \text{[Equation 1]}$$

Here, $x=[x_1, \ldots, x_{N_t}]^T$ represents an $N_t \times 1$ transmitted signal vector, $[\cdot]^T$ represents the transpose, and $w=[w_1, \ldots, w_{N_r}]T$ represents a complex circularly symmetric complex Gaussian random vector of which the covariance matrix is $E[w w^H]=\sigma^2 I_{N_r}$.

By applying QR decomposition on matrix H based on the Householder transformation, H=QR can be obtained. Here, Q is an $N_r \times N_t$ unitary matrix satisfying $Q^H Q=I_{N_t}$, and R is an $N_t \times N_t$ upper triangular matrix.

By multiplying $Q^H$ to the $N_r \times 1$ received signal vector y, Equation 1 can be expressed as Equation 2 below.

$$z = Q^H y = Q^H Hx + Q^H w = Rx + n \quad \text{[Equation 2]}$$

Here, $n=Q^H w$ represents a noise vector that is a circularly symmetric Gaussian complex random vector having $E[nn^H] = \sigma^2 I_{N_t}$ as a covariance matrix.

If the number of receiving antennas $N_r$ is greater than or equal to the number of transmitting antennas $N_t$, then z in Equation 2 can be expressed as Equation 3 below.

$$z_1 = n_1 + r_{1,N_t} \cdot x_{N_t} + \ldots + r_{1,2} \cdot x_2 + r_{1,1} \cdot x_1$$

$$z_2 = n_2 + r_{2,N_t} \cdot x_{N_t} + \ldots + r_{2,2} \cdot x_2$$

$$z_{N_t} = n_{N_t} + r_{N_t,N_t} \cdot x_{N_t}$$

For detecting the transmitted symbol $x_k$, the accumulated squared Euclidean distance of the i-th detection layer expanded from the m-th candidate branch surviving from the (i−1)-th detection layer can be expressed by Equation 4 shown below.

$$\{d_{k,m}^{(i)}\}^2 = \sum_{p=1}^{i} \left| z_{N_t - p + 1} - r_{N_t - p + 1, N_t - p + 1} \cdot s_k - \sum_{q=N_t - p + 2}^{N_t} r_{N_t - p + 1, q} \cdot \hat{x}_{m|N_t - q + 1} \right| \quad \text{[Equation 4]}$$

Here, i represents the index of the detection layer, and represents the symbol detected in the m-th branch of the j-th detection layer.

For example, in the case of the first detection layer, where i=1 and m=1, Equation 4 can be reduced to Equation 5.

$$\{d_{k,1}^{(1)}\}^2 = |z_{N_t} - r_{N_t, N_t} \cdot s_k| \quad \text{[Equation 5]}$$

It can be seen that Equation 5 is the squared Euclidean distance between $z_{N_t}$ and $r_{N_t,N_t} \cdot s_k$ in the $N_t$-th formula in Equation 3.

Accordingly, in an embodiment of the invention, determining the M number of candidate symbols (or candidate branches) in the i-th detection layer can use the smallest metric of the $N_t$-th layer, i.e. the last layer, as the optimal threshold. That is, the smallest metric (where the accumulated squared Euclidean distance is the smallest) of the $N_t$-th layer can be determined as the optimal threshold for candidate symbol detection in the i-th layer, and candidate symbols that are smaller than the optimal threshold in the i-th layer can be selected, to adaptively determine M. A more detailed description on this will be provided below with reference to FIG. 2.

In the present specification, the terms candidate symbols and candidate branches may be used separately in different sentences but these terms should be interpreted as having the same meaning.

Figure 2:
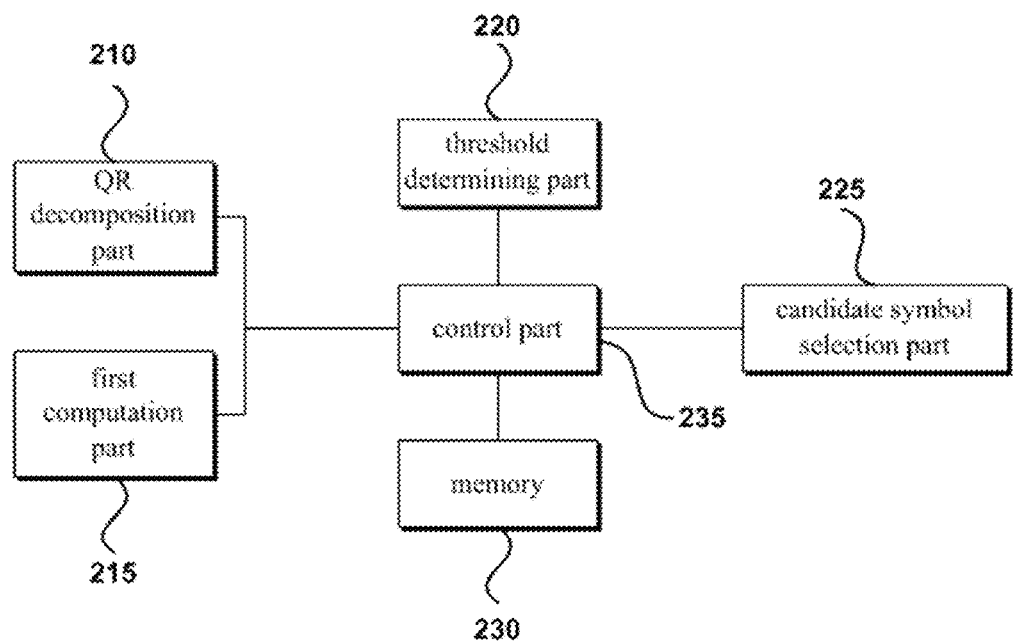
FIG. 2 is a block diagram schematically illustrating the composition of an optimal signal detection apparatus for a MIMO system according to an embodiment of the invention.
Figure 3:
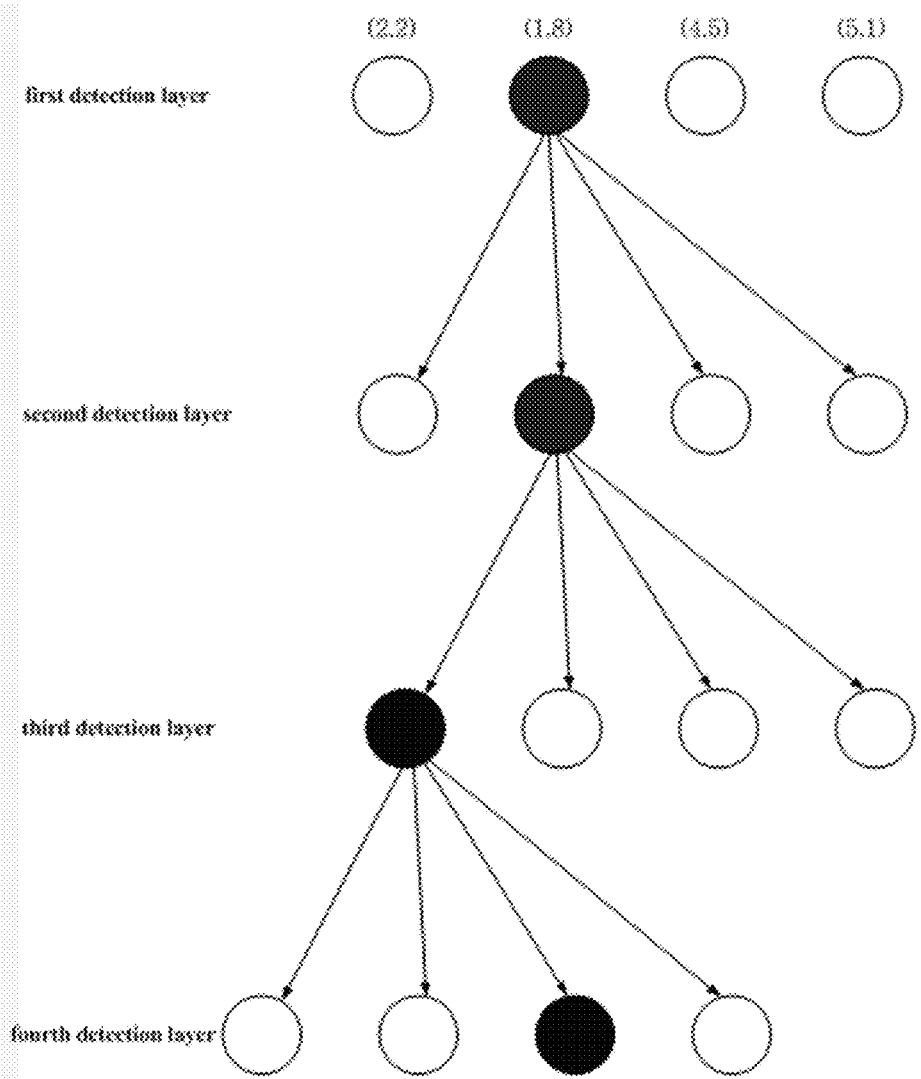
FIG. 3 and FIG. 4 are diagrams illustrating a process of signal detection for a MIMO system according to an embodiment of the invention.
Figure 4:
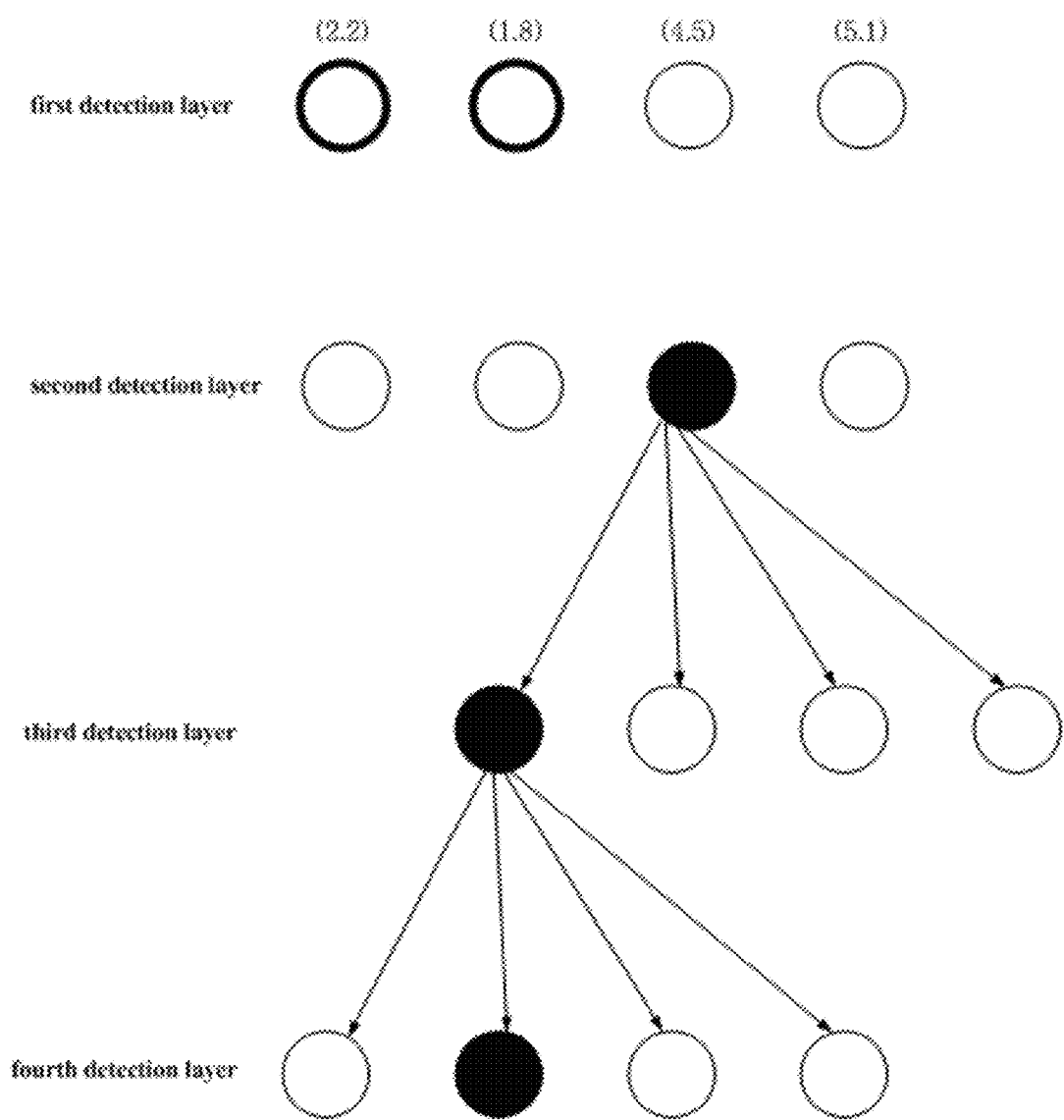

FIG. 2 is a block diagram schematically illustrating the composition of an optimal signal detection apparatus for a MIMO system according to an embodiment of the invention, while FIG. 3 and FIG. 4 are diagrams illustrating a process of signal detection for a MIMO system according to an embodiment of the invention. The optimal signal detection apparatus 200 described below can be included in a receiving device 120 of a MIMO system.

Referring to FIG. 2, an optimal signal detection apparatus 200 for a MIMO system according to an embodiment of the invention may include a QR decomposition part 210, a first computation part 215, a threshold determining part 220, a candidate symbol selection part 225, a memory 230, and a control part 235.

The QR decomposition part 210 may serve to apply QR decomposition on the channel matrix H. Since the method of applying QR decomposition on the channel matrix H is obvious to the skilled person, separate descriptions on such method are omitted here.

The first computation part 215 may serve to multiply the received signal y by the Hermitian matrix of Q, i.e. $Q^H$, where Q is obtained by the QR decomposition of the channel matrix H.

The threshold determining part 220 may serve to expand each detection layer to the final layer to compute the smallest metric of the final layer and then determine the smallest metric to be the threshold of each detection layer.

While the descriptions in the present specification focus on determining the threshold with M set to 1 (M=1) in determining the threshold of each detection layer, it is to be appreciated that M can also be set to a different value. In such cases, it is apparent that the expansion from each detection layer to the final detection layer can be for the smallest metric of the final detection layer obtained with candidate branches expanded from an M number of candidate symbols, rather than for the smallest metric obtained with an expansion from one symbol (M=1).

A method of adaptively selecting candidate symbols for each detection layer is described below in more detail with reference to FIG. 3.

For easier understanding, an example is used in which it is assumed that there are four candidate symbols in each detection layer and that there are four detection layers.

From among the four candidate symbols 311, 312, 313, 314 of the first detection layer, if the metric of the second candidate symbol is the smallest, then the first detection layer may expand candidate branches of the second candidate symbol 312 to the second detection layer.

From among the four candidate symbols 321, 322, 323, 324 of the second detection layer expanded through the candidate branches of the second candidate symbol 312, if the metric of the second candidate symbol is the smallest, then the second detection layer may expand candidate branches of the second candidate symbol 322 to the third detection layer.

After expanding to the final detection layer in this manner, the metric of the candidate symbol having the smallest metric from among the candidate symbols of the final detection layer can be determined as the threshold for the first detection layer.

For example, suppose that the smallest metric of the final detection layer is 2.5. Then, the threshold for detecting surviving candidate symbols in the first detection layer can be determined as 2.5.

The candidate symbol selection part 225 may serve to select the surviving candidate symbols of each detection layer by using the threshold (smallest metric) determined after expanding from each detection layer to the final layer.

For example, suppose that the metric (i.e. accumulated squared Euclidean distance) computed for each candidate symbol of the first detection layer is as indicated in parentheses over each candidate symbol illustrated in FIG. 4. Also suppose that the threshold of the first detection layer was determined as 2.5.

Then, the candidate symbol selection part 225 can select the first candidate symbol and the second candidate symbol, of which the metrics are smaller than or equal to the threshold (2.5) of the first detection layer, as the surviving candidate symbols.

When the detection of surviving candidate symbols for the first detection layer is completed in this manner, then an expansion may be performed from the second detection layer to the final layer to determine the smallest metric as the threshold for the second detection layer, and the threshold of the second detection layer thus determined can be used to select the surviving candidate symbols of the second detection layer.

Thus, by adaptively determining the threshold as the smallest metric after expanding from each detection layer to the final detection layer and then selecting only those symbols that have metrics smaller than or equal to the threshold, it is possible to select the number of candidate symbols (M) in each detection layer in a variable manner. Also, at the final detection layer, the candidate symbol (candidate branch) having the smallest metric can be selected.

Figure 5:
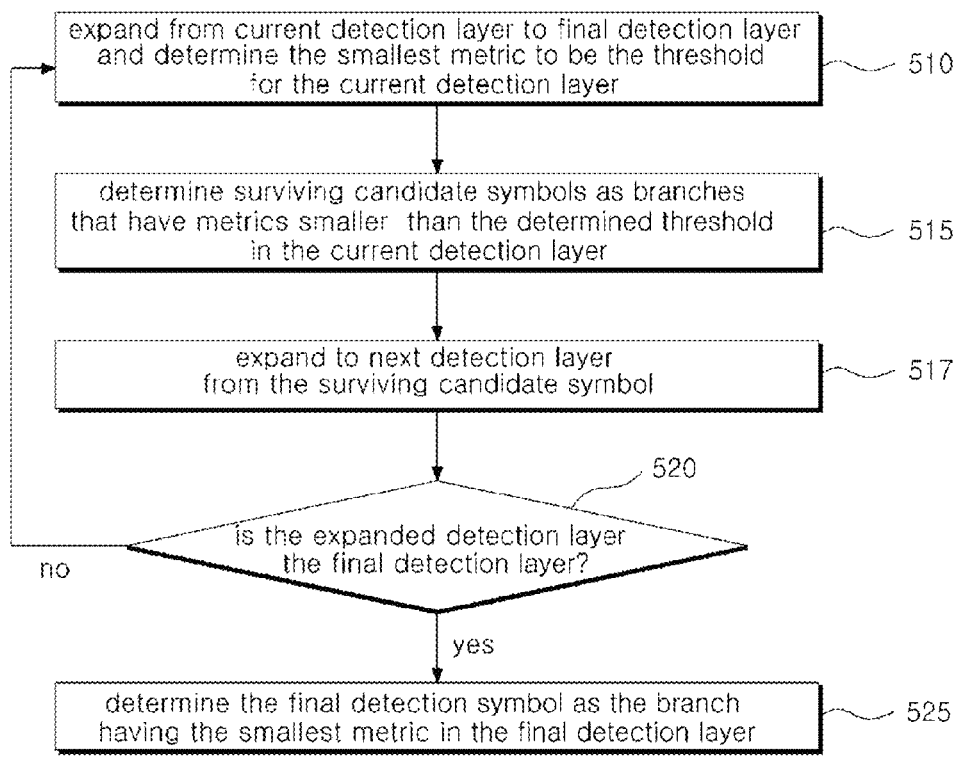
FIG. 5 is a flowchart of an optimal signal detection method for a MIMO system according to an embodiment of the invention.
Figure 6:
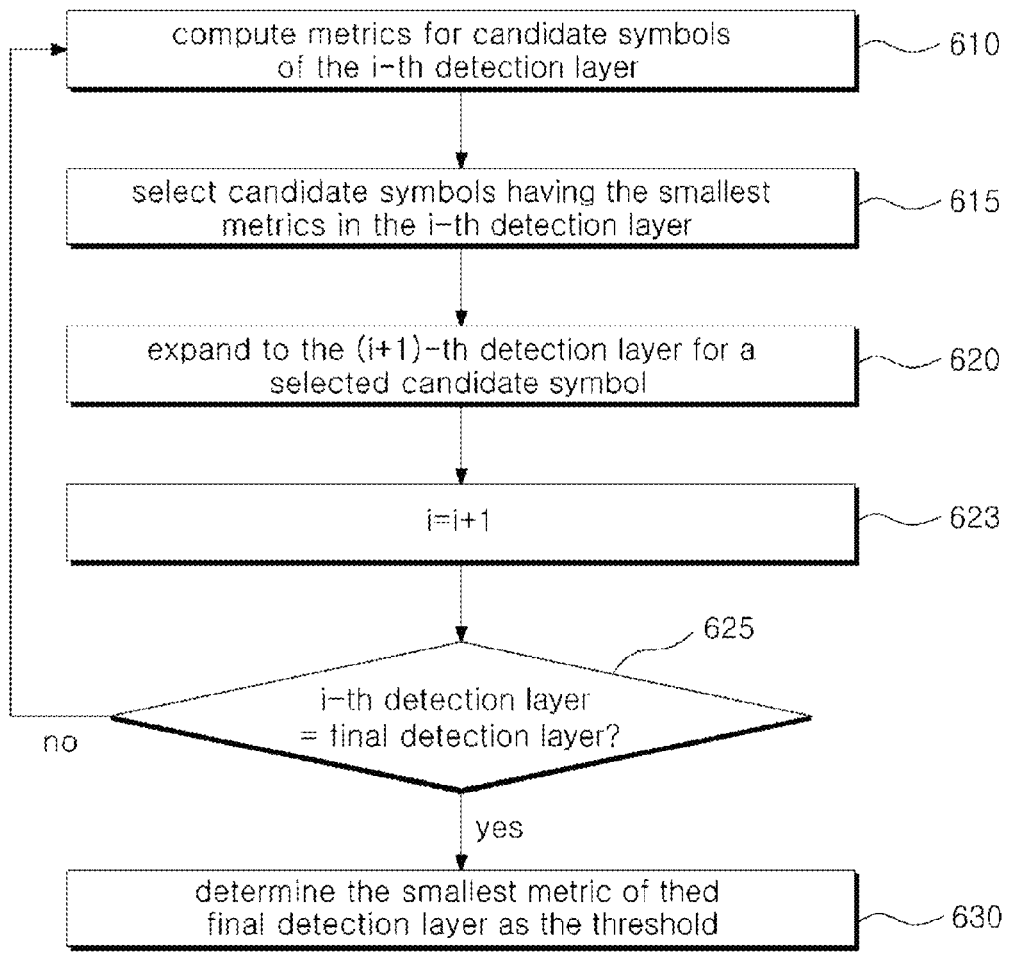
FIG. 6 is a flowchart illustrating a process of determining an optimal threshold in each detection layer according to an embodiment of the invention.

FIG. 5 is a flowchart of an optimal signal detection method for a 1\4I1\40 system according to an embodiment of the invention, and FIG. 6 is a flowchart illustrating a process of determining an optimal threshold in each detection layer according to an embodiment of the invention.

First, for easier understanding, the signal detection apparatus 200 may apply QR decomposition on the channel matrix H. Then, the signal detection apparatus 200 may multiply the received signal by a Hermitian matrix ($Q^H$) of Q, which is obtained by the QR decomposition, and use the values from the first row to the N-th row for signal detection. A more detailed description is provided below.

In operation 510, the signal detection apparatus 200 may expand from the current detection layer to the final detection layer to determine the smallest metric as the threshold for the current detection layer.

Referring to FIG. 6 for a more detailed description, in operation 610, the signal detection apparatus 200 may compute the respective metrics for the candidate symbols of the i-th detection layer.

As already described above, the metric of each candidate symbol may represent the accumulated squared Euclidean distance between a signal point (or constellation point) and the corresponding candidate symbol.

Then, in operation 615, the signal detection apparatus 200 may select the candidate symbol having the smallest metric from among the candidate symbols of the i-th detection layer.

In operation 620, the signal detection apparatus 200 may expand candidate branches to the next layer for the selected candidate symbols.

In operation 623, the signal detection apparatus 200 may increment i (i=i+1).

Then, in operation 625, the signal detection apparatus 200 may determine whether or not the detection layer expanded by the candidate branches is the final detection layer.

If the expanded detection layer is not the final detection layer, then the method may proceed to operation 610.

However, if the expanded detection layer is the final detection layer, then in operation 630, the signal detection apparatus 200 may compute the metrics for the candidate symbols of the expanded detection layer, find the smallest metric, and choose it as the threshold for the i-th detection layer.

This can be expressed as Equation 6 below.

$$T_D^{(i)} = \min_{k,m}\{d_{k,m}^{(i)}\}^2 + \sum_{d=i+1}^{i+D} \min_k \left| z_{N_t-d+1} - r_{N_t-d+1,N_t-d+1} \cdot s_k - \sum_{q=N_t-d+2}^{N_t} r_{N_t-d+1,q} \cdot \hat{x}_{m|N_t-q+1} \right|$$ [Equation 6]

Here, m=1, 2, ..., $M^{(i-1)}$ and i=1, 2, ..., $N_t$-1. Also, $M^{(i-1)}$ represents the number of surviving candidate branches of the (i-1)-th detection layer.

In order to obtain the optimal threshold for each detection layer, the process of selecting the branches of the smallest metric in each layer and expanding them to the next layer may be repeated, as illustrated in FIG. 6, to repeat the process of determining the optimal threshold as the smallest metric of the final detection layer.

To be more specific, when determining the threshold for the first detection layer, the expansion of branches to the next detection layer from the smallest metric can be repeated from the first detection layer onward, to determine the smallest metric at the final detection layer as the threshold for the first detection layer.

When determining the threshold for the second detection layer, the expansion of branches to the next detection layer from the smallest metric can be repeated from the second detection layer onward, regardless of the threshold for the first detection layer determined above, to determine the smallest metric at the final detection layer as the threshold for the second detection layer.

In this manner, the expansion of branches from the smallest metric of the candidate symbols from each detection layer to the next detection layer can be repeated for all of the detection layers, to determine the threshold for each detection layer as the smallest metric of the final detection layer for each respective case.

Referring again to FIG. 5, in operation 515, the signal detection apparatus 200 may determine the surviving candidate symbols of each detection layer with the threshold determined above.

In operation 517, the signal detection apparatus 200 may expand from the surviving candidate symbols to the next detection layer.

In operation 520, the signal detection apparatus 200 may determine whether or not the expanded detection layer is the final detection layer.

If the expanded detection layer is not the final detection layer, then the surviving candidate symbols may be expanded to the next detection layer, and the method may proceed to operation 510.

However, if the next detection layer is the final detection layer, in operation 525, the signal detection apparatus 200 may select the final detection symbol with the branch having the smallest metric from among the metrics of the candidate symbols of the final detection layer.

Thus, in order to determine the threshold for selecting surviving candidate symbols for each detection layer, the signal detection apparatus 200 can repeat the process of selecting the branch having the smallest metric from the current detection layer and expanding it to the next layer, and upon arriving at the final layer, can determine the smallest metric of the final layer as the optimal threshold for the i-th layer.

Then, the signal detection apparatus 200 can repeat the process of determining the surviving candidate symbols of each detection layer as at least one candidate symbol that has a metric smaller than or equal to the threshold that was adaptively determined for each detection layer (i.e. the smallest metric of the final layer).

The reason why the symbol of ML detection is always included when detecting the candidate symbols for each detection layer according to an embodiment of the invention is as follows. If ML detection were applied, then the branch selected at the final detection layer would be optimal, and would have the smallest branch metric. Therefore, the optimal threshold for the i-th detection layer determined with the smallest metric obtained at the final detection layer according to an embodiment of the invention would always be greater than or equal to the optimal ML branch metric of the last detection layer.

Also, since the metric is a value that is either increased or maintained according to detection layer, the optimal ML metric at the i-th detection layer would be smaller than or equal to the optimal ML metric at the last detection layer.

Therefore, the optimal threshold for the i-th detection layer determined with the smallest metric at the last detection layer according to an embodiment of the invention is always greater than or equal to the optimal ML branch metric of the i-th detection layer.

Consequently, the branches selected by the optimal threshold for the i-th detection layer may always include the optimal ML branch. If the optimal signal detection process is repeated until the last detection layer, the surviving branches selected by the optimal threshold at each detection layer may always include the optimal ML branch, so that the symbols detected according to an embodiment of the invention may be the same as those obtained by ML detection.

Figure 7:
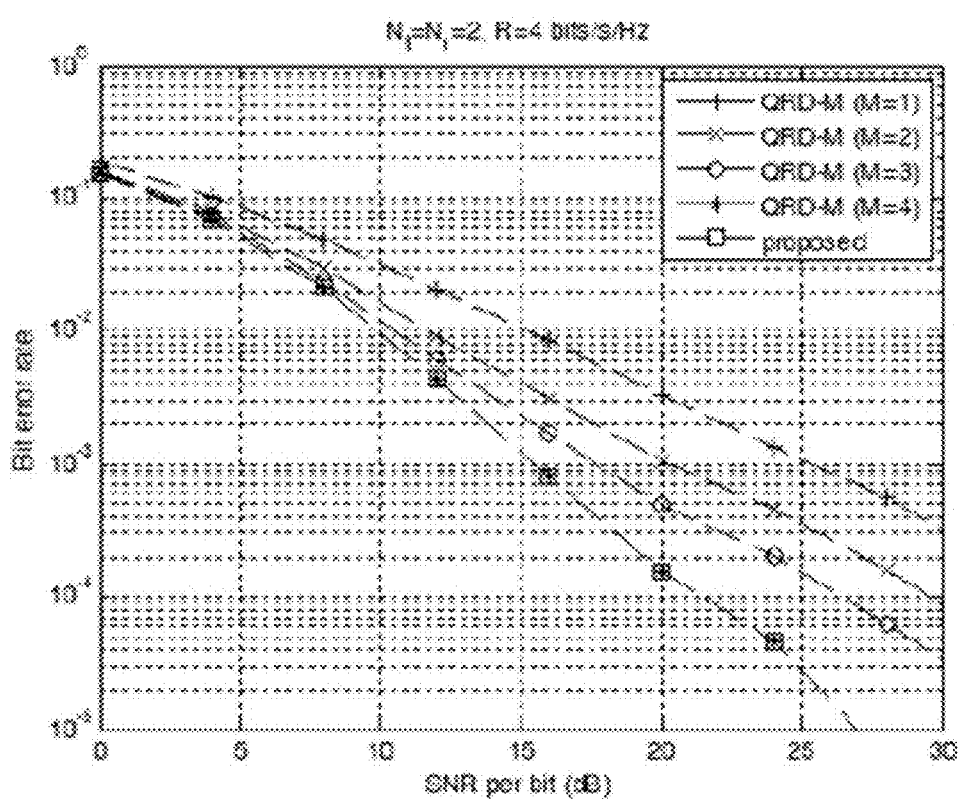
FIG. 7 is a graph comparing the BER performance of 2×2 MIMO systems using 4-QAM according to the related art and according to an embodiment of the invention.
Figure 8:
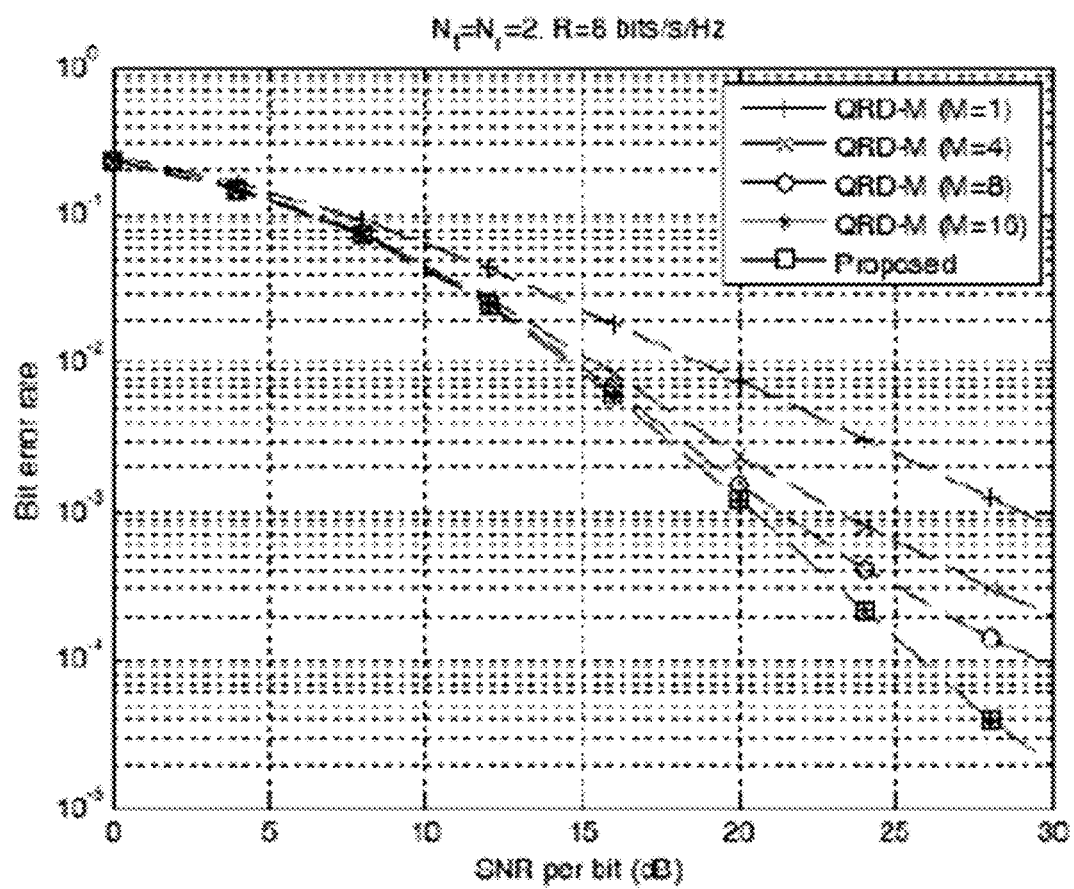
FIG. 8 is a graph comparing the BER performance of 2×2 MIMO systems using 16-QAM according to the related art and according to an embodiment of the invention.

FIG. 7 is a graph comparing the BER performance of 2×2 MIMO systems using 4-QAM according to the related art and according to an embodiment of the invention, and FIG. 8 is a graph comparing the BER performance of 2×2 MIMO systems using 16-QAM according to the related art and according to an embodiment of the invention.

In FIG. 7, when M=4 for a 2×2 MIMO system, it can be seen that the BER performance of the signal detection method according to an embodiment of the invention is exactly the same as the BER performance of ML detection.

In FIG. 8, when M=16, it can be seen that the BER performance of the signal detection method according to an embodiment of the invention is exactly the same as the BER performance of ML detection.

Figure 9:
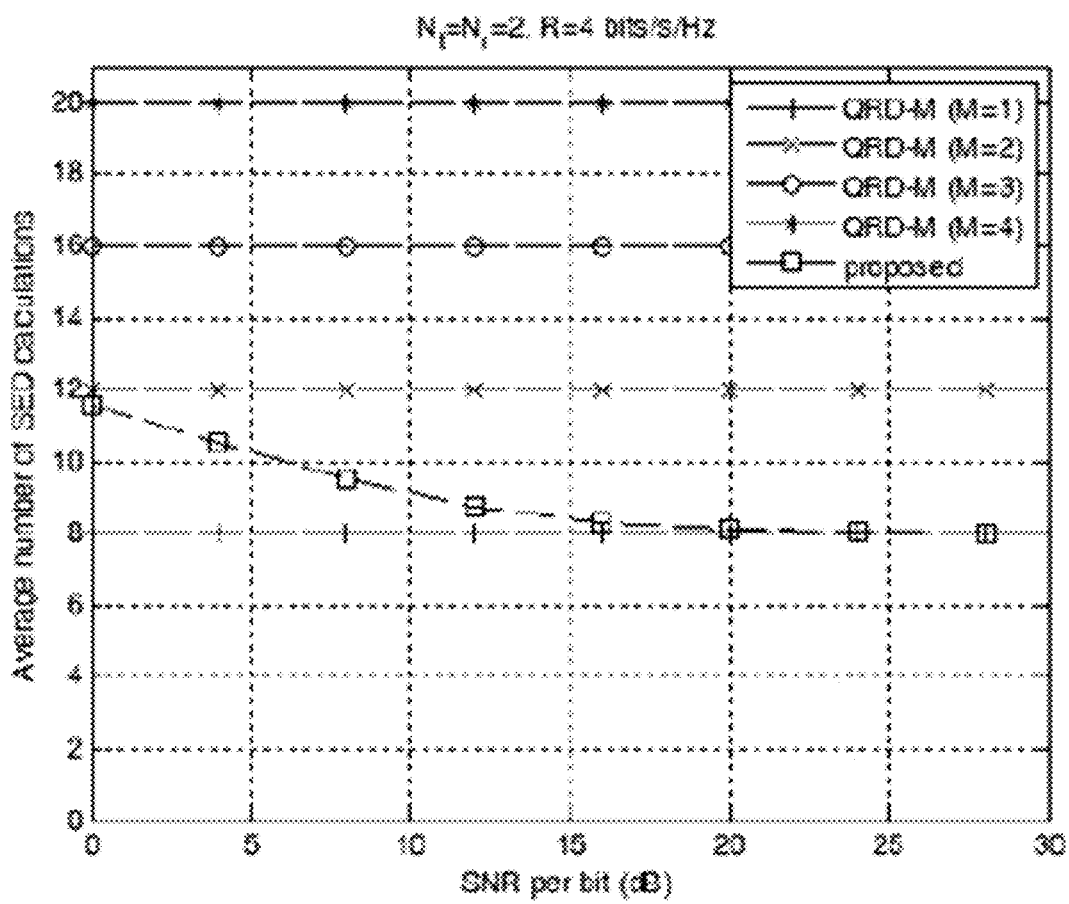
FIG. 9 is a graph comparing the number of calculations of accumulated squared Euclidean distance with respect to SNR in 2×2 MIMO systems using 4-QAM according to the related art and according to an embodiment of the invention.
Figure 10:
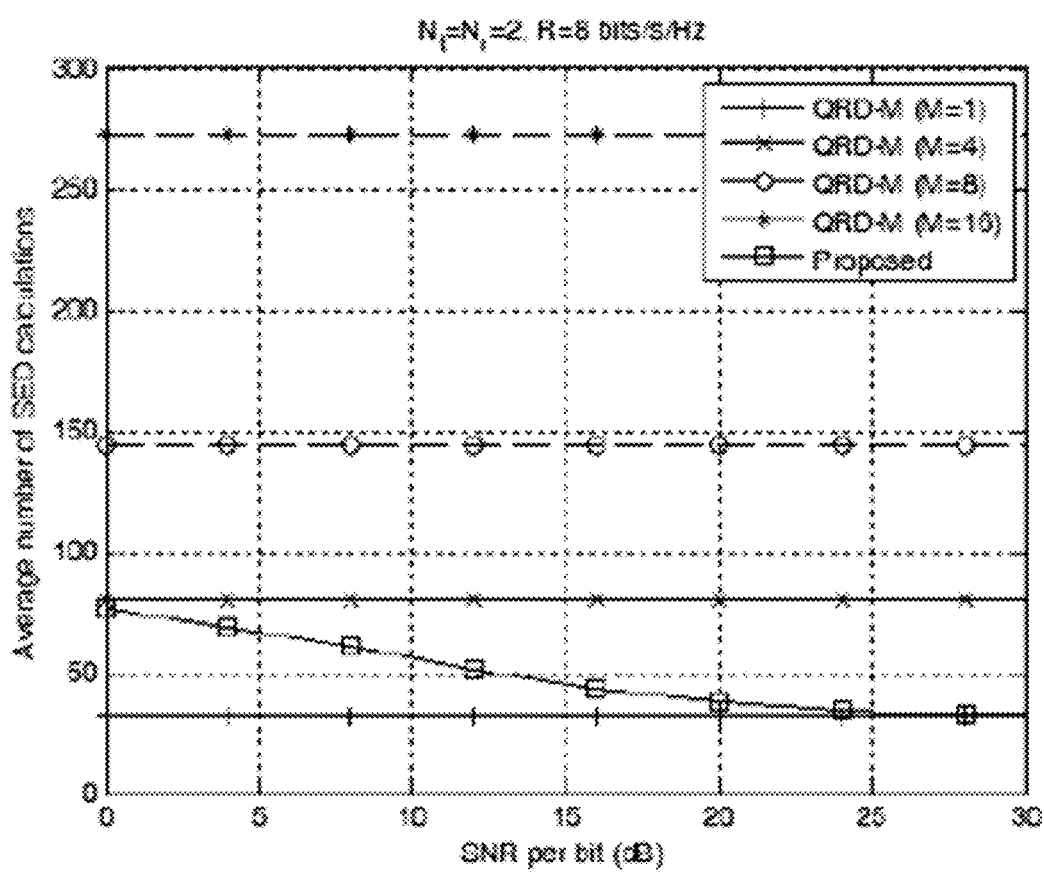
FIG. 10 is a graph comparing the number of calculations of accumulated squared Euclidean distance with respect to SNR in 2×2 MIMO systems using 16-QAM according to the related art and according to an embodiment of the invention.

FIG. 9 is a graph comparing the number of calculations of accumulated squared Euclidean distance with respect to SNR in 2×2 MIMO systems using 4-QAM according to the related art and according to an embodiment of the invention, and FIG. 10 is a graph comparing the number of calculations of accumulated squared Euclidean distance with respect to SNR in 2×2 MIMO systems using 16-QAM according to the related art and according to an embodiment of the invention.

In FIG. 9 and FIG. 10, it can be seen that the signal detection method according to an embodiment of the invention provides the same BER performance as that of maximum likelihood detection, but the computational complexity approaches the minimum complexity of QRD-M as the SNR increases.

Also, an optimal signal detection method according to an embodiment of the invention may repeat the process of selecting the smallest metric and expanding up to the final detection layer in order to find the optimal threshold, but in cases where there are large numbers of inputs and outputs, the smallest metric for setting the threshold of the i-th detection layer can be obtained by expanding up to only the min(i+D)-th detection layer, instead of the final detection layer, to further reduce complexity.

Also, an optimal signal detection method according to an embodiment of the invention can set a limit on the maximum number of candidate symbols selected for each detection layer, and if the number of candidate symbols having metrics smaller than or equal to the optimal threshold for a layer is greater than the maximum number limit, then the surviving candidate symbols can be selected in a number that does not exceed the maximum number limit in the order of smallest to largest metrics of the candidate symbols in each layer.

Figure 11:
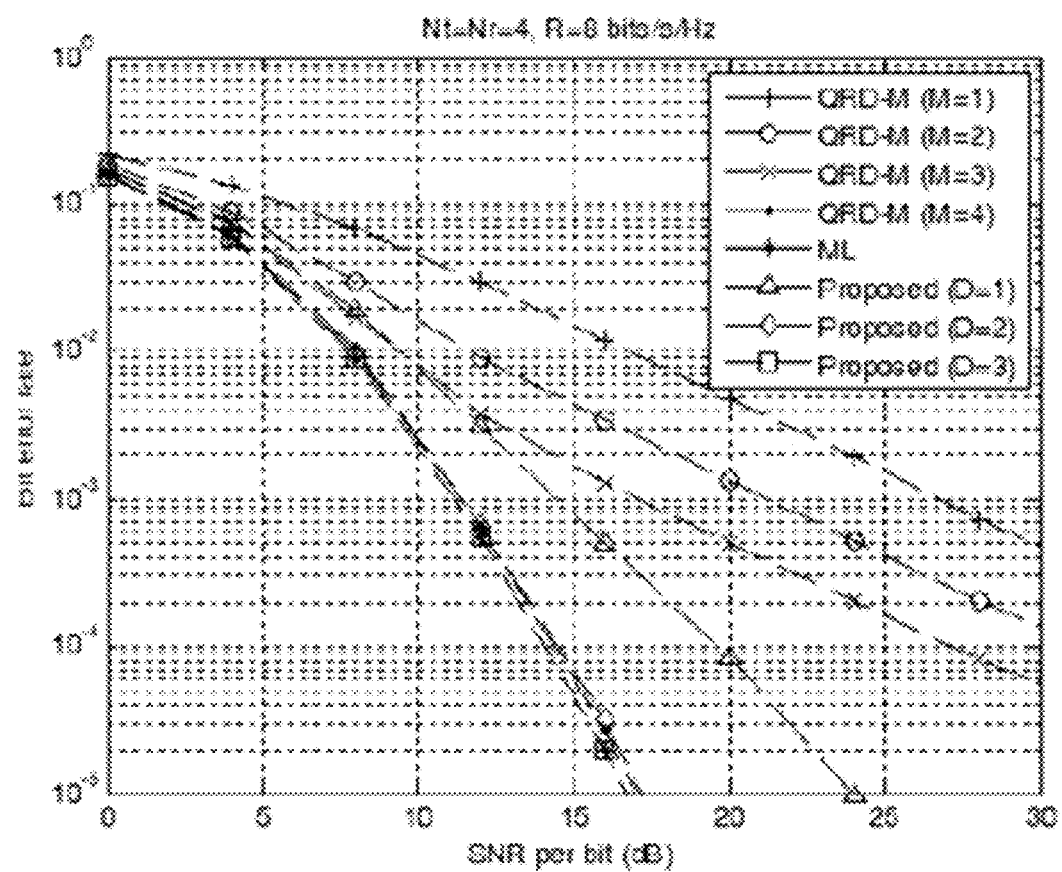
FIG. 11 is a graph comparing the BER performance of 4×4 MIMO systems using 4-QAM according to the related art and according to an embodiment of the invention.
Figure 12:
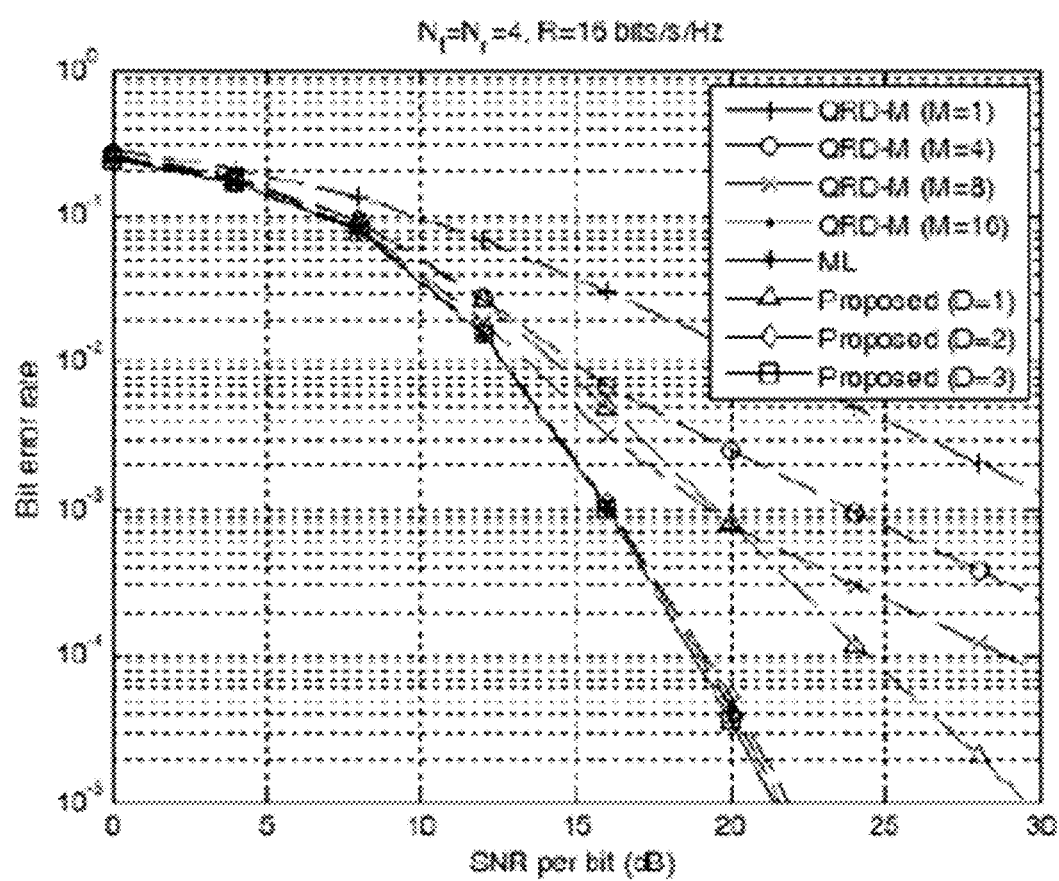
FIG. 12 is a graph comparing the BER performance of 4×4 MIMO systems using 16-QAM according to the related art and according to an embodiment of the invention.

FIG. 11 is a graph comparing the BER performance of 4×4 MIMO systems using 4-QAM according to the related art and according to an embodiment of the invention, and FIG. 12 is a graph comparing the BER performance of 4×4 MIMO systems using 16-QAM according to the related art and according to an embodiment of the invention.

In FIG. 11 and FIG. 12, it can be seen that, in the case of a 4×4 MIMO system, the performance is better with greater values of D, and when D=3, setting the threshold of the corresponding detection layer as the smallest metric of the final detection layer provides a performance that matches ML detection.

Figure 13:
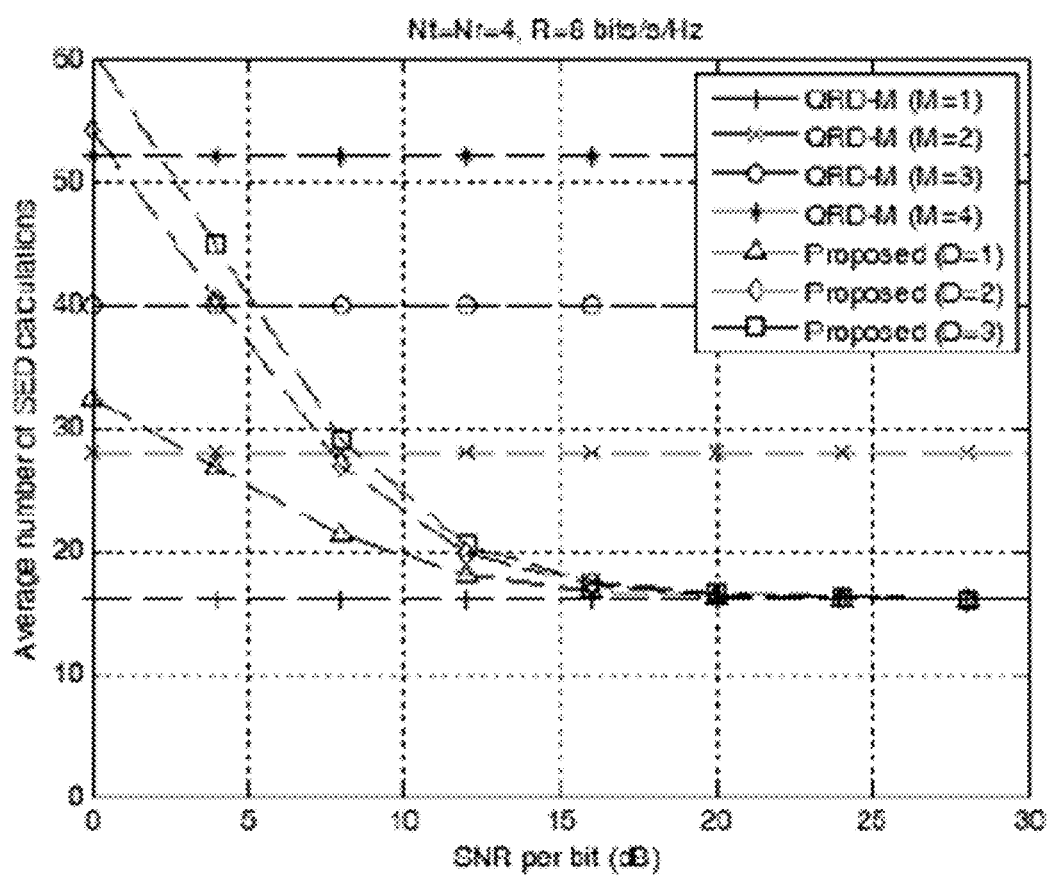
FIG. 13 is a graph comparing the number of calculations of accumulated squared Euclidean distance with respect to SNR in 4×4 MIMO systems using 4-QAM according to the related art and according to an embodiment of the invention.
Figure 14:
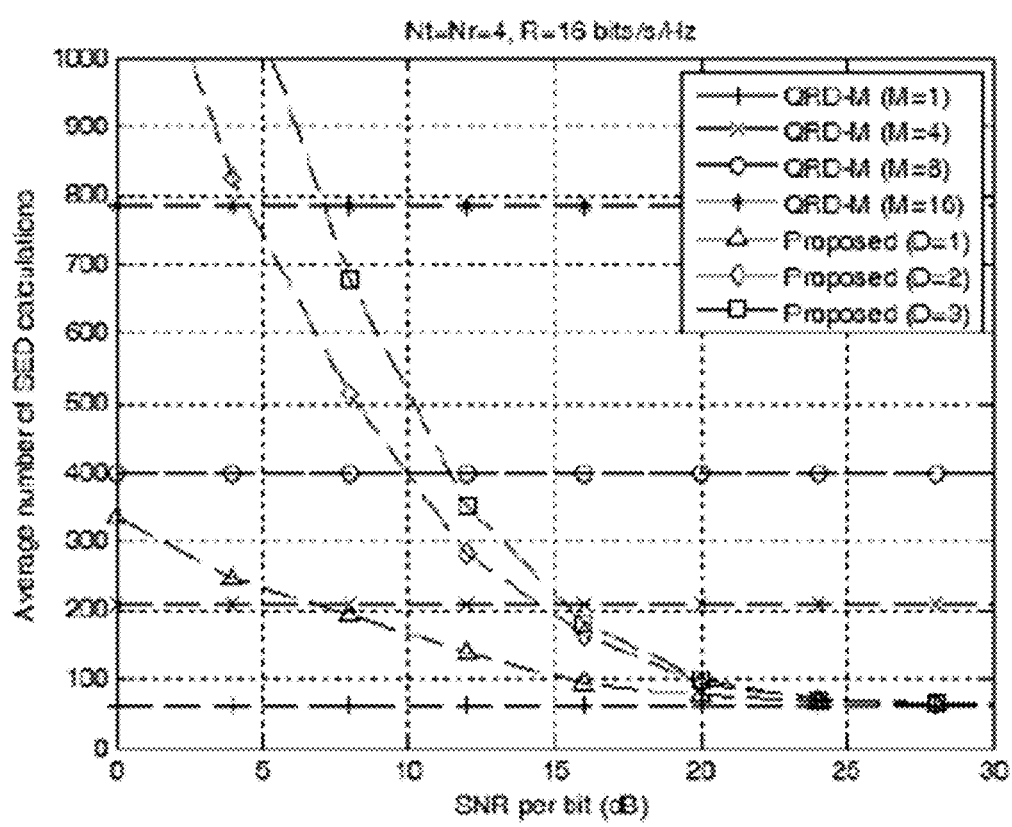
FIG. 14 is a graph comparing the number of calculations of accumulated squared Euclidean distance with respect to SNR in 4×4 MIMO systems using 16-QAM according to the related art and according to an embodiment of the invention.

FIG. 13 is a graph comparing the number of calculations of accumulated squared Euclidean distance with respect to SNR in 4×4 MIMO systems using 4-QAM according to the related art and according to an embodiment of the invention, and FIG. 14 is a graph comparing the number of calculations of accumulated squared Euclidean distance with respect to SNR in 4×4 MIMO systems using 16-QAM according to the related art and according to an embodiment of the invention.

In FIG. 13 and FIG. 14, it can be seen that the complexity increases with greater values of D, but with a signal detection method according to an embodiment of the invention, the complexity approaches the minimum complexity of QRD-M with increasing SNR, regardless of the value of D.

The embodiments of the present invention can be implemented in the form of program instructions that may be performed using various computer means and can be recorded in a computer-readable medium. Such a computer-readable medium can include program instructions, data files, data structures, etc., alone or in combination.

The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc.

The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. An optimal signal detection method for a multiple-input multiple-output system, the optimal signal detection method comprising:
   determining a smallest metric of a final layer expanded from candidate symbols of an i-th detection layer as an optimal threshold of the i-th detection layer,
   wherein the determining of the smallest metric of the final layer comprises:
   selecting a candidate symbol having a smallest metric from the i-th detection layer; and
   expanding candidate branches of the candidate symbol to an (i+1)-th detection layer,
   wherein the expanding of the candidate branches is iteratively performed up to the final layer; and
   selecting a surviving candidate symbol from among the candidate symbols of the i-th detection layer by using the optimal threshold.

2. The optimal signal detection method for a multiple-input multiple-output system according to claim 1, further comprising:
   expanding the selection of the surviving candidate symbol from the (i+1)-th detection layer to the final layer.

3. The optimal signal detection method for a multiple-input multiple-output system according to claim 1, wherein the selecting of the surviving candidate symbol of the i-th detection layer comprises:
   selecting a candidate symbol having an accumulated squared Euclidean distance smaller than or equal to the optimal threshold from among the candidate symbols of the i-th detection layer as the surviving candidate symbol.

4. The optimal signal detection method for a multiple-input multiple-output system according to claim 1, wherein the selecting of the surviving candidate symbol comprises:
   selecting the surviving candidate symbol such that a number of surviving candidate symbols does not exceed a preset maximum candidate symbol limit number if a number of candidate symbols of the i-th detection layer having the accumulated Euclidean distance smaller than or equal to the optimal threshold is greater than the maximum candidate symbol limit number.

5. The optimal signal detection method for a multiple-input multiple-output system according to claim 4, wherein the selecting of the surviving candidate symbol comprises:
   selecting the surviving candidate symbol such that a number of surviving candidate symbols does not exceed a preset maximum candidate symbol limit number in an order of smallest to largest metric of the candidate symbols of the i-th detection layer.

6. The optimal signal detection method for a multiple-input multiple-output system according to claim 1, further comprising:
selecting a candidate symbol having a smallest metric as the surviving candidate symbol in the final detection layer.

7. The optimal signal detection method for a multiple-input multiple-output system according to claim 1, wherein the smallest metric is a smallest value of an accumulated squared Euclidean distance of each candidate symbol.

8. The optimal signal detection method for a multiple-input multiple-output system according to claim 1, wherein said i is a natural number and is an index of a detection layer in which the surviving candidate symbol is selected, and a maximum value of said i is smaller than or equal to an index of the final detection layer.

9. A recorded medium product having recorded thereon and tangibly embodying a program code for performing the method according to claim 1.

10. An optimal signal detection apparatus for a multiple-input multiple-output system, the optimal signal detection apparatus comprising:
a threshold determining part configured to determine a smallest metric of a final layer expanded from candidate symbols of an i-th detection layer as an optimal threshold of the i-th detection layer,
wherein the threshold determining part selects a candidate symbol having a smallest metric from the i-th detection layer, and expands candidate branches of the candidate symbol to an (i−1)-th detection layer, with the expanding of the candidate branches performed iteratively up to the final layer, and selects the smallest metric of the final layer as the optimal threshold of the i-th detection layer; and
a candidate symbol selection part configured to select a surviving candidate symbol from among the candidate symbols of the i-th detection layer by using the optimal threshold.

11. The optimal signal detection apparatus for a multiple-input multiple-output system according to claim 10, wherein the threshold determining part determines an optimal threshold of the (i+1)-th detection layer by expanding candidate branches from the (i+1)-th detection layer to the final layer, regardless of the optimal threshold of the i-th detection layer.

12. The optimal signal detection apparatus for a multiple-input multiple-output system according to claim 10, wherein the threshold determining part selects a branch having a smallest metric from the i-th detection layer and expands candidate branches to an (i+1)-th detection layer, with the expanding of the candidate branches performed iteratively up to a min(i+D, N)-th layer,
where said N is a number of multiple inputs, said min(a, b) is a function representing a minimum value between a and b, and said i is an index of a detection layer in which the surviving candidate symbol is selected.

13. The optimal signal detection apparatus for a multiple-input multiple-output system according to claim 10, wherein the candidate symbol selection part selects a candidate symbol having an accumulated squared Euclidean distance smaller than or equal to the optimal threshold from among the candidate symbols of the i-th detection layer as the surviving candidate symbol.

* * * * *